(12) United States Patent
Stein et al.

(10) Patent No.: US 7,269,615 B2
(45) Date of Patent: Sep. 11, 2007

(54) RECONFIGURABLE INPUT GALOIS FIELD LINEAR TRANSFORMER SYSTEM

(75) Inventors: Yosef Stein, Sharon, MA (US); Haim Primo, Tikwa (IL); Yaniv Sapir, Rehovot (IL)

(73) Assignee: Analog Devices, Inc., Norwood, MA (US)

(*) Notice: Subject to any disclaimer, the term of this patent is extended or adjusted under 35 U.S.C. 154(b) by 503 days.

(21) Appl. No.: 10/136,170

(22) Filed: May 1, 2002

(65) Prior Publication Data

US 2003/0115234 A1 Jun. 19, 2003

Related U.S. Application Data

(60) Provisional application No. 60/341,737, filed on Dec. 18, 2001.

(51) Int. Cl.
G06F 15/00 (2006.01)

(52) U.S. Cl. ...................................... 708/492

(58) Field of Classification Search ................ 708/492
See application file for complete search history.

(56) References Cited

U.S. PATENT DOCUMENTS

| | | | |
|---|---|---|---|
| 3,303,477 A | 2/1967 | Voigt | |
| 3,658,864 A | 4/1972 | Golitz et al. | |
| 3,805,037 A | 4/1974 | Ellison | |
| 4,322,577 A | 3/1982 | Braendstroem et al. | |
| 4,685,132 A | 8/1987 | Bishop et al. | |
| 4,722,050 A | 1/1988 | Lee et al. | |
| 4,847,801 A | 7/1989 | Tong | |
| 4,852,098 A | 7/1989 | Brechard et al. | |
| 4,890,255 A | 12/1989 | Lehmann et al. | |
| 4,918,638 A | 4/1990 | Matsumoto et al. | |
| 4,975,867 A | 12/1990 | Weng | |
| 5,062,057 A | 10/1991 | Blacken et al. | |
| 5,095,525 A | 3/1992 | Almgren et al. | |
| 5,101,338 A | 3/1992 | Fujiwara et al. | |
| 5,214,763 A | 5/1993 | Blaner et al. | |
| 5,379,243 A | 1/1995 | Greenberger et al. | |
| 5,386,523 A | 1/1995 | Crook et al. | |
| 5,396,502 A * | 3/1995 | Owsley et al. .............. 708/492 |

(Continued)

FOREIGN PATENT DOCUMENTS

EP 1 246 389 A1 10/2002

OTHER PUBLICATIONS

Viktor Fischer, *Realization of the Round 2 AES Candidates Using Altera FPGA*, (Jan. 26, 2001) <http://csrc.nist.gov/CryptoToolkit/aes/roun2/conf3/papers/24-vfischer.pdf> (Micronic—Kosice, Slovakia).

(Continued)

Primary Examiner—Meng-Al T. An
Assistant Examiner—Chat C Do
(74) Attorney, Agent, or Firm—Iandiorio & Teska

(57) ABSTRACT

A reconfigurable input Galois field linear transformer system includes a Galois field linear transformer including a matrix of cells; a plurality of storage planes for storing control patterns representing a number of different functions; a storage plane selector circuit for selecting a storage plane representing a function for enabling the cells of the matrix which defines that function; and a reconfigurable input circuit for delivering input data to the enabled cells to apply that function to the input data.

12 Claims, 6 Drawing Sheets

U.S. PATENT DOCUMENTS

| | | | |
|---|---|---|---|
| 5,446,850 | A | 8/1995 | Jeremiah et al. |
| 5,502,665 | A | 3/1996 | Im |
| 5,642,367 | A | 6/1997 | Kao |
| 5,680,070 | A | 10/1997 | Anderson et al. |
| 5,689,452 | A | 11/1997 | Cameron |
| 5,696,941 | A | 12/1997 | Jung |
| 5,754,563 | A | 5/1998 | White |
| 5,768,168 | A * | 6/1998 | Im ............................. 708/492 |
| 5,832,290 | A | 11/1998 | Gostin et al. |
| 5,890,800 | A | 4/1999 | Meyer |
| 5,964,826 | A | 10/1999 | Wei |
| 5,996,057 | A | 11/1999 | Scales, III et al. |
| 5,996,066 | A | 11/1999 | Yung |
| 5,999,959 | A | 12/1999 | Weng et al. |
| 6,038,577 | A | 3/2000 | Burshtein |
| 6,049,815 | A | 4/2000 | Lambert et al. |
| 6,057,703 | A | 5/2000 | Mok et al. |
| 6,067,609 | A | 5/2000 | Meeker et al. |
| 6,121,791 | A | 9/2000 | Abbott |
| 6,138,208 | A | 10/2000 | Dhong et al. |
| 6,141,786 | A * | 10/2000 | Cox et al. ................... 708/492 |
| 6,199,086 | B1 | 3/2001 | Dworkin et al. |
| 6,199,087 | B1 | 3/2001 | Blake et al. |
| 6,199,088 | B1 | 3/2001 | Weng et al. |
| 6,208,163 | B1 | 3/2001 | Wittig et al. |
| 6,223,320 | B1 | 4/2001 | Dubey et al. |
| 6,230,179 | B1 | 5/2001 | Dworkin et al. |
| 6,246,768 | B1 | 6/2001 | Kim |
| 6,279,023 | B1 | 8/2001 | Weng et al. |
| 6,285,607 | B1 | 9/2001 | Sinclair |
| 6,298,136 | B1 | 10/2001 | Den Boer |
| 6,317,763 | B1 | 11/2001 | Vatinel |
| 6,343,305 | B1 | 1/2002 | Koç et al. |
| 6,349,318 | B1 | 2/2002 | Vanstone et al. |
| 6,384,713 | B1 | 5/2002 | Yu |
| 6,389,088 | B1 | 5/2002 | Blois et al. |
| 6,415,030 | B2 | 7/2002 | Matsui et al. |
| 6,434,662 | B1 | 8/2002 | Greene et al. |
| 6,438,569 | B1 * | 8/2002 | Abbott ....................... 708/603 |
| 6,480,845 | B1 | 11/2002 | Egolf et al. |
| 6,539,477 | B1 | 3/2003 | Seawright |
| 6,587,864 | B2 | 7/2003 | Stein et al. |
| 6,766,344 | B2 | 7/2004 | Dubey et al. |
| 6,779,011 | B2 | 8/2004 | Weng et al. |
| 2002/0003876 | A1 | 1/2002 | Lim |
| 2002/0021802 | A1 | 2/2002 | Muratani et al. |
| 2002/0041685 | A1 | 4/2002 | McLoone et al. |
| 2002/0051537 | A1 | 5/2002 | Rogaway |
| 2002/0147825 | A1 | 10/2002 | Stein et al. |
| 2002/0156823 | A1 | 10/2002 | Weng et al. |
| 2002/0159599 | A1 | 10/2002 | Matsui et al. |
| 2003/0039355 | A1 | 2/2003 | McCanny et al. |
| 2003/0053623 | A1 | 3/2003 | McCanny et al. |
| 2003/0103626 | A1 | 6/2003 | Stein et al. |
| 2003/0105791 | A1 | 6/2003 | Stein et al. |
| 2003/0110196 | A1 | 6/2003 | Stein et al. |
| 2003/0133568 | A1 | 7/2003 | Stein et al. |
| 2003/0140211 | A1 | 7/2003 | Stein et al. |
| 2003/0140212 | A1 | 7/2003 | Stein et al. |
| 2003/0140213 | A1 | 7/2003 | Stein et al. |
| 2003/0149857 | A1 | 8/2003 | Stein et al. |
| 2004/0145942 | A1 | 7/2004 | Leijten-Nowak |
| 2004/0210618 | A1 | 10/2004 | Stein et al. |
| 2005/0058285 | A1 | 3/2005 | Stein et al. |

OTHER PUBLICATIONS

Máire McLoone and J.V. McCanny, *High Performance Single-Chip FPGA Rijndael Algorithm Implementations*, CHES 2001 Proc, LNCS 2162, 65-76 (ç.K. Koç et al. eds. May 16, 2001).

elixent, *Changing the Electronic Landscape* (2001) <http://www.elixent.com> (elixent—Bristol, UK).

elixent Application Note *JPEG Codec* (Dec. 9, 2002) <http://www.elixent.com/assets/jpeg-coder.pdf> (elixent—Brist l, UK).

U.S. Appl. No. 10/440,330, filed May 16, 2003, Stein et al.

U.S. Appl. No. 10/395,620, filed Mar. 24, 2003, Stein et al.

V. Baumgarte et al., *PACT XPP—A Self-Reconfigurable Data Processing Architecture* (Jun. 2001) <http://www.pactcorp.com/xneu/download/ersa01.pdf> (PACT XPP—Santa Clara, CA).

PACT Informationstechnolgie GmbH, *The XPP White Paper Release 2.1* (Mar. 27, 2002) <http://www.pactcorp.com/xneu/download/xpp_white_paper.pdf> (PACT XPP —Santa Clara, CA).

\* cited by examiner

RECONFIGURABLE INPUT GALOIS FIELD LINEAR TRANSFORMER SYSTEM

RELATED APPLICATIONS

This application claims priority of U.S. Provisional application 60/341,737 to Stein et al. filed Dec. 18, 2001 entitled PROGRAMMABLE GF2-ALU LINEAR FEEDBACK SHIFT REGISTER—INCOMING DATA SELECTION.

FIELD OF THE INVENTION

This invention relates to a reconfigurable input Galois field linear transformer system.

BACKGROUND OF THE INVENTION

Galois field linear transformers have recently been improved (U.S. patent application Ser. No. 10/051,533 to Stein et al., filed Jan. 18, 2002 entitled GALOIS FIELD LINEAR TRANSFORMER) so that they can perform historically multicycle operations in one cycle using predictive logic. In that approach each cell of the Galois field linear transformer (GFLT) includes an AND gate, an Exclusive OR gate and a storage device. The storage device is used to enable or disable its associated cell in order to implement a pattern of enabled/disabled cells that define a particular function that will be applied to the input data e.g. bit permutation, cyclic redundancy checking (CRC), scrambling/descrambling and convolutional coding. Typically, the entire matrix of cells making up the GFLT is set to a pattern to perform a particular function even when only a portion of the matrix is required. This is not economical of power or die size.

BRIEF SUMMARY OF THE INVENTION

It is therefore an object of this invention to provide an improved reconfigurable input Galois field linear transformer system.

It is a further object of this invention to provide such an improved reconfigurable input Galois field linear transformer system which is more economical of power and die size.

It is a further object of this invention to provide such an improved reconfigurable input Galois field linear transformer system in which the same configuration plane can be shared by different functions.

It is a further object of this invention to provide such an improved reconfigurable input Galois field linear transformer system that enables the transformer to perform both memory and memory-less bit manipulation separately or simultaneously.

It is a further object of this invention to provide such an improved reconfigurable input Galois field linear transformer system which can select and combine any byte combination of the present data and previous state inputs.

The invention results from the realization that an improved Galois field linear transformer (GFLT) system with a plurality of storage planes for storing control patterns representing a number of different bit manipulation functions can be easily reconfigured and can perform more than one function in a configuration plane can be achieved by selecting a storage plane representing a chosen function for enabling the cells of the GFLT matrix and reconfiguring the input circuit to deliver the input data to the enabled cells to apply that function to the input data.

This invention features a reconfigurable input Galois field linear transformer system including a Galois field linear transformer having a matrix of cells and a plurality of storage planes for storing control patterns representing a number of different functions. A storage plane selector circuit selects a storage plane representing a function for enabling the cells of the matrix which defines that function. A reconfigurable input circuit delivers input data to the enabled cells to apply that function to the input data.

In a preferred embodiment, each cell may include an exclusive OR logic circuit, an AND logic circuit having an output connected to the exclusive OR logic circuit, and an input for receiving an input data bit. Each storage plane may include a storage device associated with each cell. Each storage device may include a plurality of storage units disposed with the associated cell, one storage unit corresponding to each storage plane. Each storage device may include a multistage register disposed with the associated cell, one stage corresponding to each storage plane. The storage plane selector circuit may include a plane selection register. The reconfigurable input circuit may include at least a first input register and a switching system for directing the input data from the first input register to the enabled cells. The switching system may include a plurality of switching circuits, one associated with each byte of input data in the first input register. There may be a second input register and the switching system may direct the input data selectively from the first and second input registers to the enable cells. The storage device may be programmable.

BRIEF DESCRIPTION OF THE DRAWINGS

Other objects, features and advantages will occur to those skilled in the art from the following description of a preferred embodiment and the accompanying drawings, in which.

PREFERRED EMBODIMENT

Figure 1:
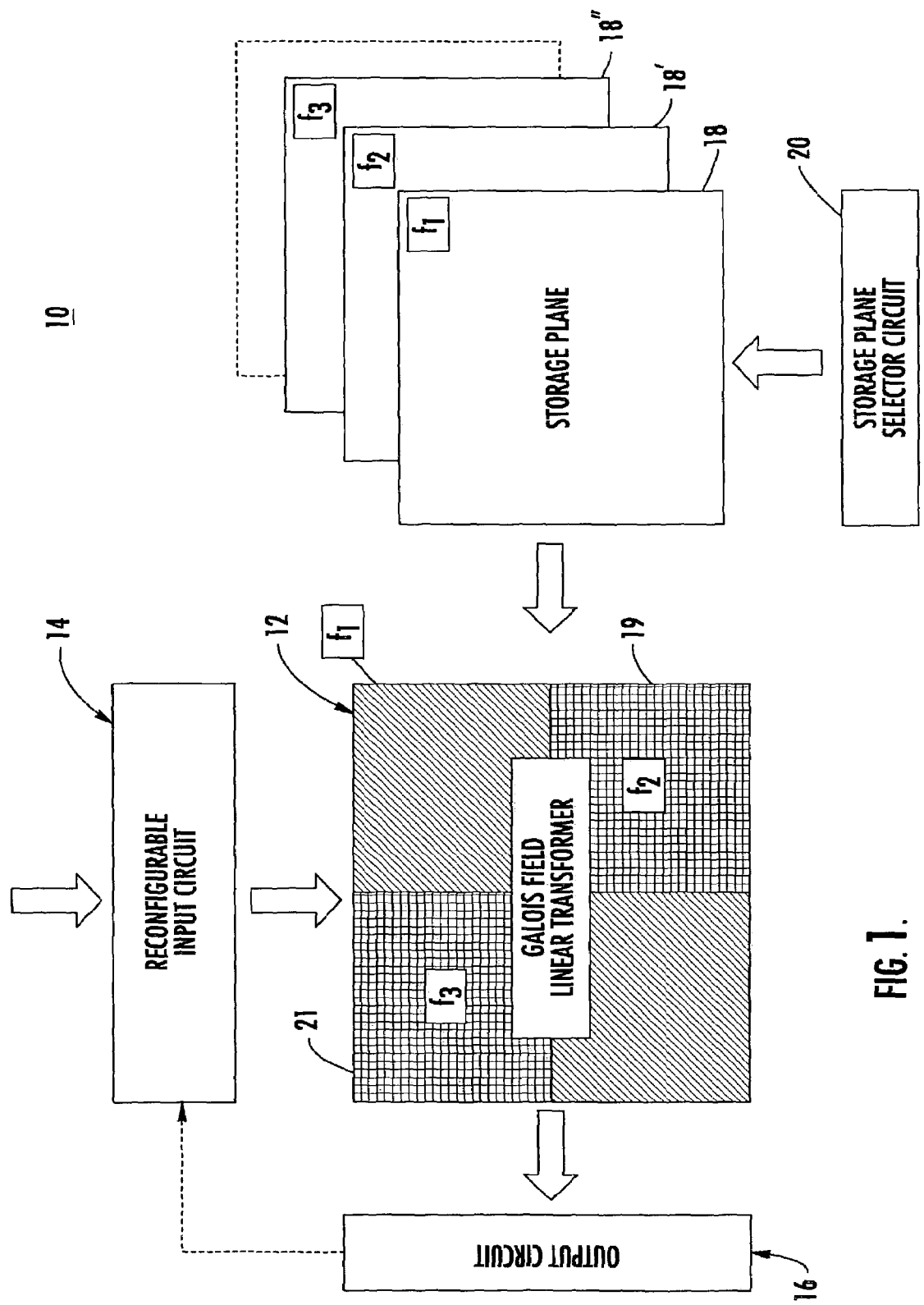
FIG. 1 is a simplified schematic block diagram of a reconfigurable input Galois field linear transformer (GFLT) system according to this invention.

There is shown in FIG. 1 a reconfigurable input Galois field linear transformer system 10 including Galois field linear transformer 12, reconfigurable input circuit 14, output circuit 16 and a plurality of storage planes 18, 18', 18" which are individually selectable by storage plane selector circuit 20. The control pattern contained in each of the storage planes 18, 18', 18" may employ all or only a part of the full Galois field linear transformer. For example, while storage plane 18 representing function $f_1$ employs the entire array of cells in Galois field linear transformer 12, the function $f_2$, whose control pattern is contained on storage plane 18', requires only a quarter 19 of the entire (GFLT) 12. Similarly, function $f_3$, represented by the control pattern on storage plane 18" requires only a quarter 21 of the entire array of cells in (GFLT) 12. While these smaller portions 19 and 21 are shown neatly disposed in the corners of the (GFLT) 12, this is not a necessary limitation as the cells may be programmed to use any part of the (GFLT) 12 matrix of cells.

Figure 2:
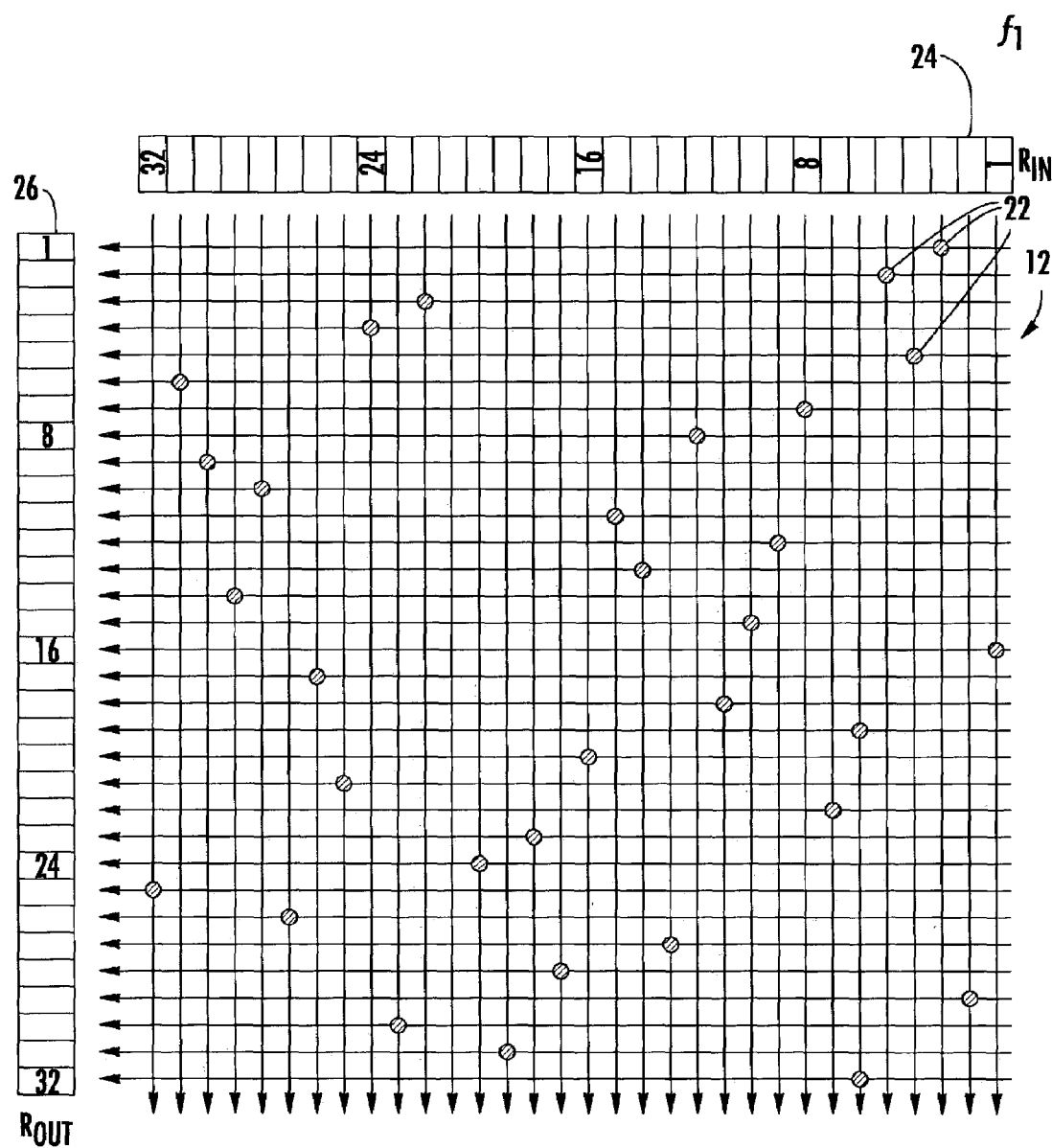
FIG. 2 is a simplified schematic diagram illustrating a pattern of enable cells in a GFLT for executing the function $f_1$ represented by a storage plane of FIG. 1.
Figure 3:
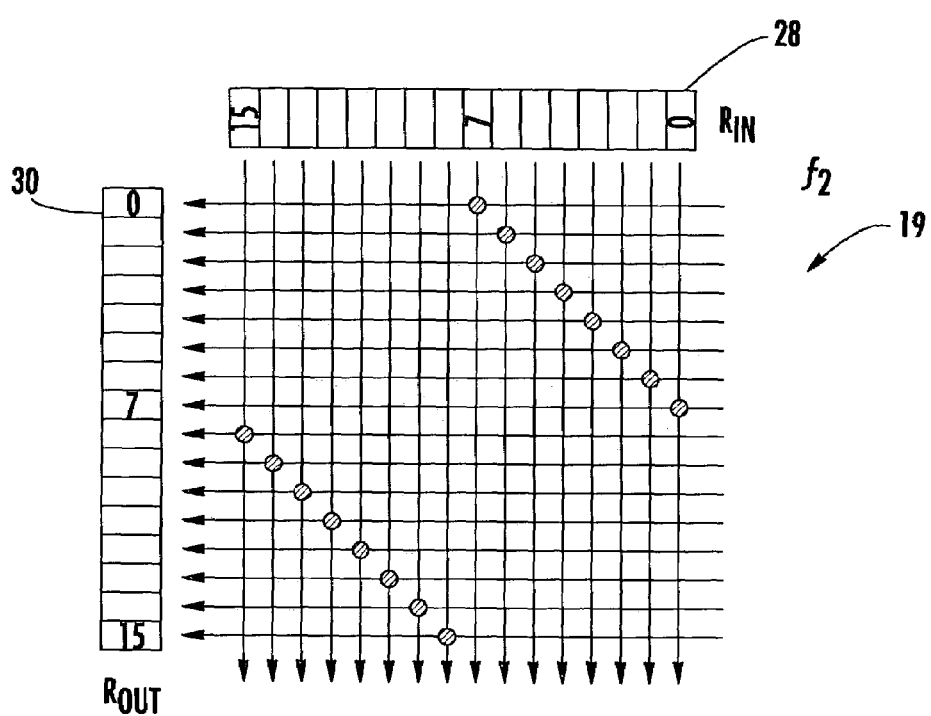
FIG. 3 is a simplified schematic diagram illustrating a pattern of enable cells in a GFLT for executing the function $f_2$ represented by a storage plane of FIG. 1.

Galois field linear transformer (GFLT) 12 may be made up by a thirty-two bit matrix of cells (1024 cell matrix), a sixty-four bit matrix of cells (4096 cell matrix), or any other desired size whether smaller or larger. Keeping with this invention, each cell has associated with it a storage plane 18, 18', 18" each of which stores a pattern of settings of the individual cells that represents a particular function $f_1$, $f_2$, $f_3$ to be performed by (GFLT) 12. For example, storage plane 18 may contain a control pattern for implementing a permutation of the input to the output. Function 2, $f_2$, of storage plane 18' may contain a control pattern for swapping the order of the input with respect to the output. By alternately selecting one of storage planes 18, 18', 18" one can utilize (GFLT) 12 to perform function $f_1$, function $f_2$, function $f_3$ or any other function for which the control pattern has been stored in a storage plane. For example if storage plane selector circuit 20 selects storage plane 18, then function $f_1$ will be implemented as shown in FIG. 2 where the thirty-two bit matrix of cells 12 displays as a shaded circle those cells which are enabled, cell 22. Input register 24 which presents the bits 1–32 in an ordered fashion has those bits permutated in accordance with the pattern of cell enablement depicted in FIG. 2 so that they are permutated in output register 26. For example, the data in bit position one in input register 24 are presented at bit position sixteen in output register 26. The data in bit position two of input register 24 is presented at bit position twenty-nine in output register 26 and so on. By deselecting storage plane 18 and selecting storage plane 18', which represents the control pattern for function $f_2$, the pattern of cell enablement depicted in FIG. 3 will occur. Here the smaller subsection 19, a sixteen bit portion of the matrix containing 256 bits is operated by a portion 28 of input register 24 to reverse the order of the bits located in bit positions 0–7 and separately reverse the order of the bits in bit positions 8–15 as presented at the corresponding portion 30 of output register 26. Thus, for example the bits at the input register bit positions 0–7 will appear at the bit positions 7–0 of the portion 30 of output register 26 and the data at bit positions at 8–15 of portion 28 of input register 24 will appear at positions 15–8 of portion 30 of output register 26.

Figure 4:
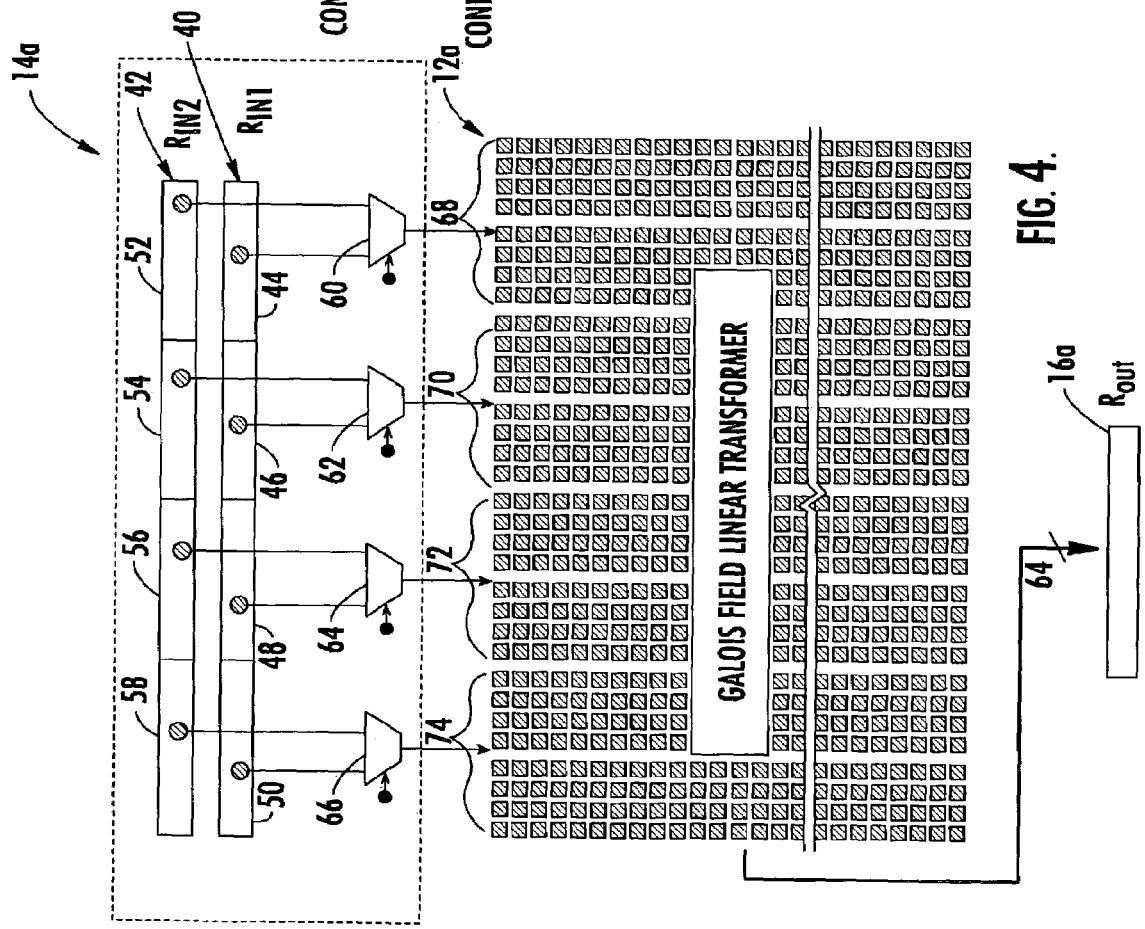
FIG. 4 is a more detailed schematic diagram of the GFLT system of FIG. 1 showing a reconfigurable input circuit according to this invention.
Figure 5:
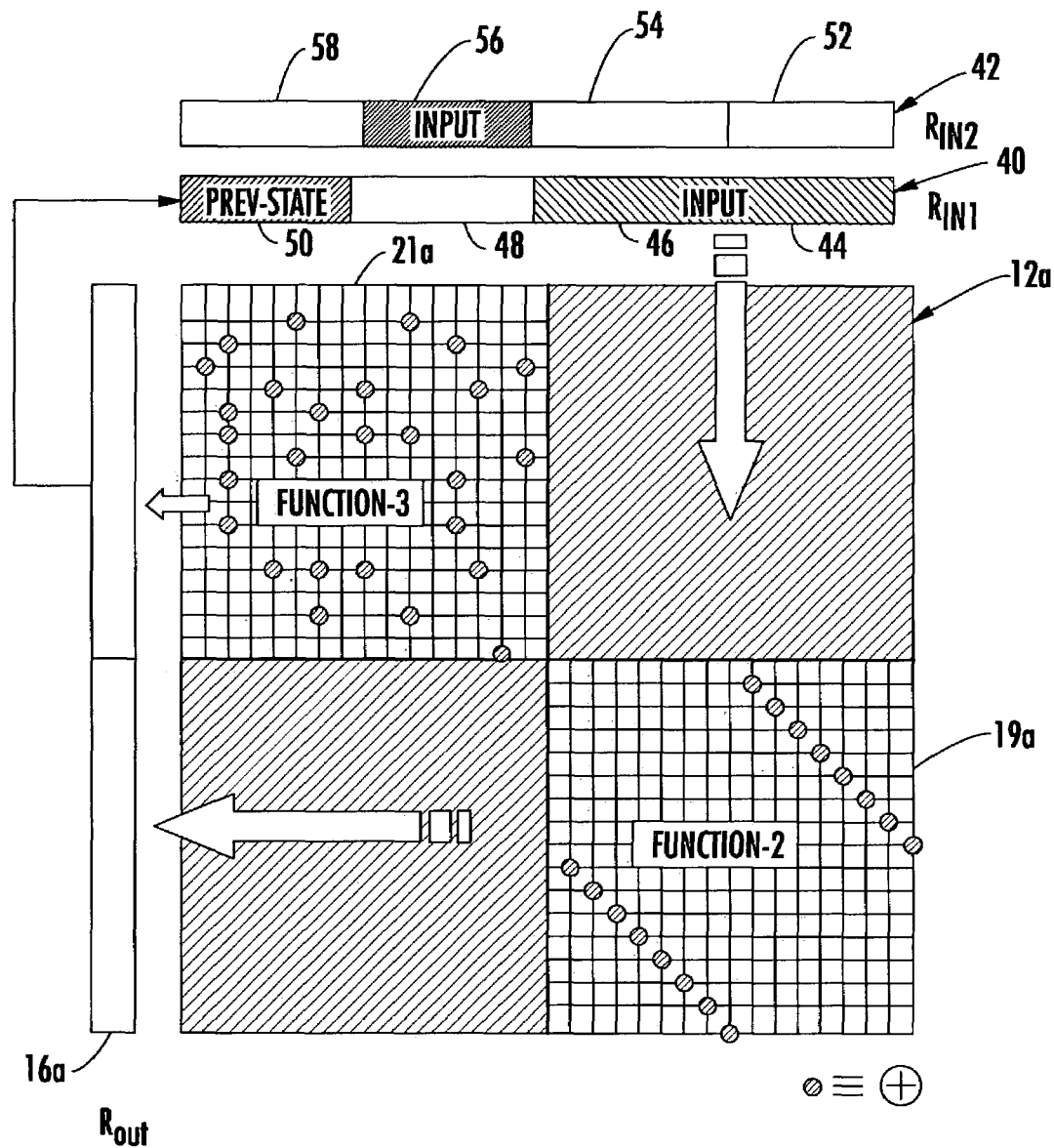
FIG. 5 is a functional diagram of a GFLT system for effecting a number of functions one of which is a predictive, multi cycle Galois field transformation, the second a memory-less bit manipulation.

In one embodiment, reconfigurable input circuit 14a, FIG. 4, includes more than one input register, register 40 and input register 42, each of which can hold four bytes in its byte sections 44–50 and 52–58. Also included in reconfigurable input circuit 14a are multiplexors 60, 62, 64, and 66, one associated with each byte section of input registers 40 and 42. There is one multiplexor 60–66 for each byte section and each of those multiplexors is connected to a byte section in each of the two registers as shown. (GFLT) 12a is again shown as a thirty-two by thirty-two bit array of cells the length of the columns having been foreshortened for convenience of presentation. Each of the multiplexors 60, 62, 64, and 66 can provide the eight bit byte from one its two associated registers to the eight columns of cells which it serves. For example, multiplexor 60 may deliver either the bits from byte section 44 or the bits from byte section 52 to any of the cells in the eight cell columns 68 with which it is associated. Multiplexors 62, 64 and 66 can perform similarly with respect to their associated columns 70, 72 and 74 and multiplexors 60–66 can be operated in any combination. For example, multiplexor 60 could choose byte section fifty-two from register 42 while multiplexors 62 and 64 choose byte sections 46 and 48 from register 40 and multiplexor 60 may choose byte section 58 from register 42 for example. Thus, the data residing in registers 40 and 42 can be applied to the cells in any given pattern. This selective delivery of the data to the cells in (GFLT) transformer 12a in combination with the ability to select a particular storage plane representing a particular function enables the same Galois field linear transformer 12a to perform a number of different functions depending upon the selection of the storage plane and the functions stored therein and the selective delivery of the data from reconfigurable input circuit 14a. This not only saves on the die size for the system but is also economical of power. Further, with the use of two or more input registers, for example input registers 40 and 42, both memory and memory less bit manipulation and predictive Galois filed transformation can be accomplished separately or simultaneously. Thus, it is no longer necessary to shift the data from register to register: the data in registers 40 and 42 can simultaneously, in one cycle, be byte selected combined and loaded into (GFLT) 12a through multiplexors 60–66. This also permits, in a multi cycle Galois field predictive transformation, the selection of the linear transformer output (previous state) as one of the inputs, as shown in FIG. 5. There the function $f_3$ in portion 21a, of (GFLT) 12a implements a predictive multi cycle Galois field transformation as taught in U.S. patent application Ser. No. 10/051,533 to Stein et al., filed Jan. 18, 2002 entitled GALOIS FIELD LINEAR TRANSFORMER (AD-239J) incorporated herein in its entirety by reference. Also incorporated herein in its entirety by reference is U.S. patent application Ser. No. 10/060,699 to Stein et al., filed Jan. 30, 2002, entitled GALOIS FIELD MULTIPLIER SYSTEM (AD-240J). There the previous state of the transform performed in portion 21a is delivered from the corresponding portion of output register 16a and loaded in byte section 50 of register 40 and the input is loaded in byte section 56 of register 42 so that both can be simultaneously delivered to portion 21a of GFLT 12a which has had the control pattern of, for example, storage plane 18" applied to it to implement function $f_3$ as explained in U.S. patent application Ser. No. 10/051,533 to Stein et al., filed Jan. 18, 2002 entitled GALOIS FIELD LINEAR TRANSFORMER.

Figure 6:
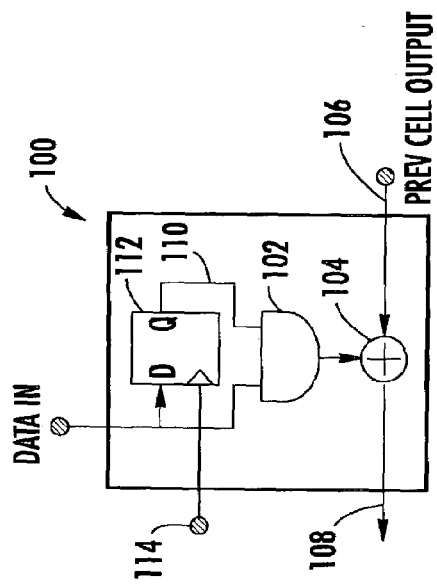
FIG. 6 is a more detailed view of one cell of the GFLT.
Figure 9:
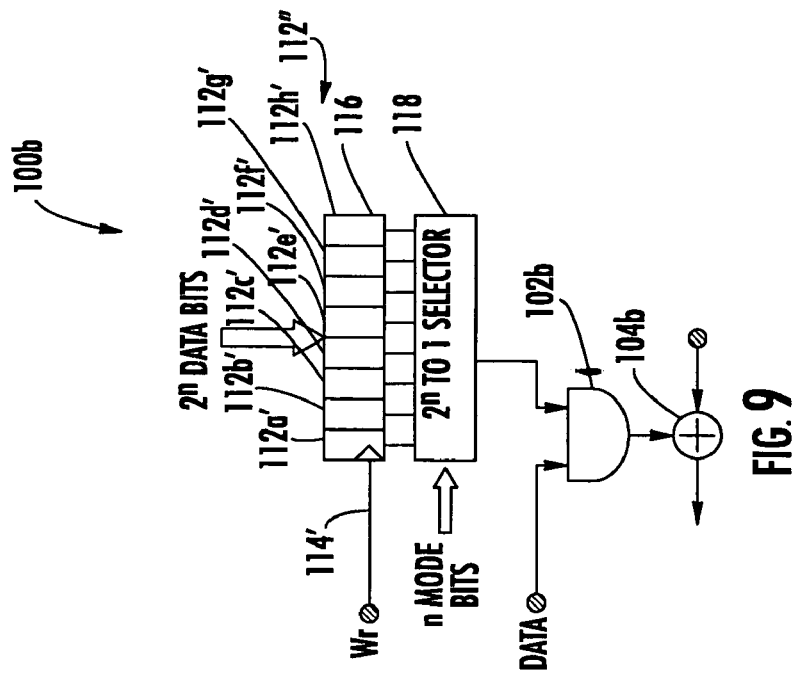
FIG. 9 is a more detailed view of a cell showing another construction of a storage device using a multistage register.
Figure 8:
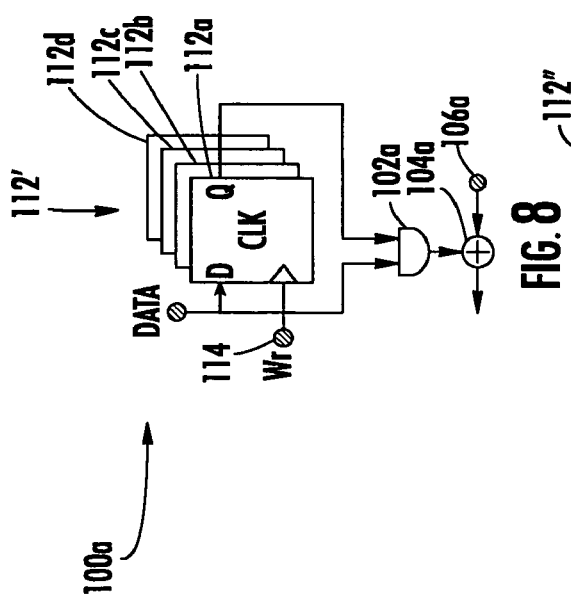
FIG. 8 is a more detailed view of a cell showing one construction of a storage device using a plurality of storage units.
Figure 8A:
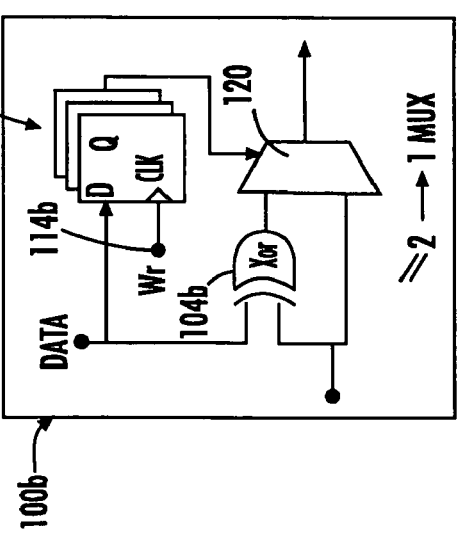
FIG. 8A is a schematic diagram of an alternative storage device which performs logical AND functions without a specific AND gate.

Each cell 100, FIG. 6 of (GFLT) 12a includes an AND gate 102 whose output is connected to an exclusive OR gate 104 which receives output from the previous cell on line 106 and provides outputs to the next cell on line 108. AND gate 102 is caused to enable or disable exclusive OR gate 104 by means of its input on line 110 from storage device 112 which in this case is a simple flip-flop. In one state storage device 112 causes AND gate 102 to enable exclusive OR gate 104 and thus enables cell 100; in the other state it does not, and cell 100 is not enabled. The condition of storage device 112 is controlled by a signal on line 114. The storage device 112 need not be implemented by a flip-flop, any other storage device could be used. In FIGS. 8 and 9 cells 100a and 100b respectively need AND functions and exclusive OR functions, but these may be performed in a number of different ways not requiring a specific XOR gate or AND gate as long as these are logic circuits that function in a Boolean sense like an XOR gate and AND gate. For example, the AND function can be achieved without a specific AND gate using a 2:1 input multiplexor 120, FIG. 8A which performs the AND function. Storage device 112" is envisioned as a part of a storage plane and will have been set on its control line 114 in accordance with the control pattern of enabled cells required to implement for example function $f_1$, or if storage device 112 is associated with storage plane 18' then in accordance with the function $f_2$.

Figure 7:
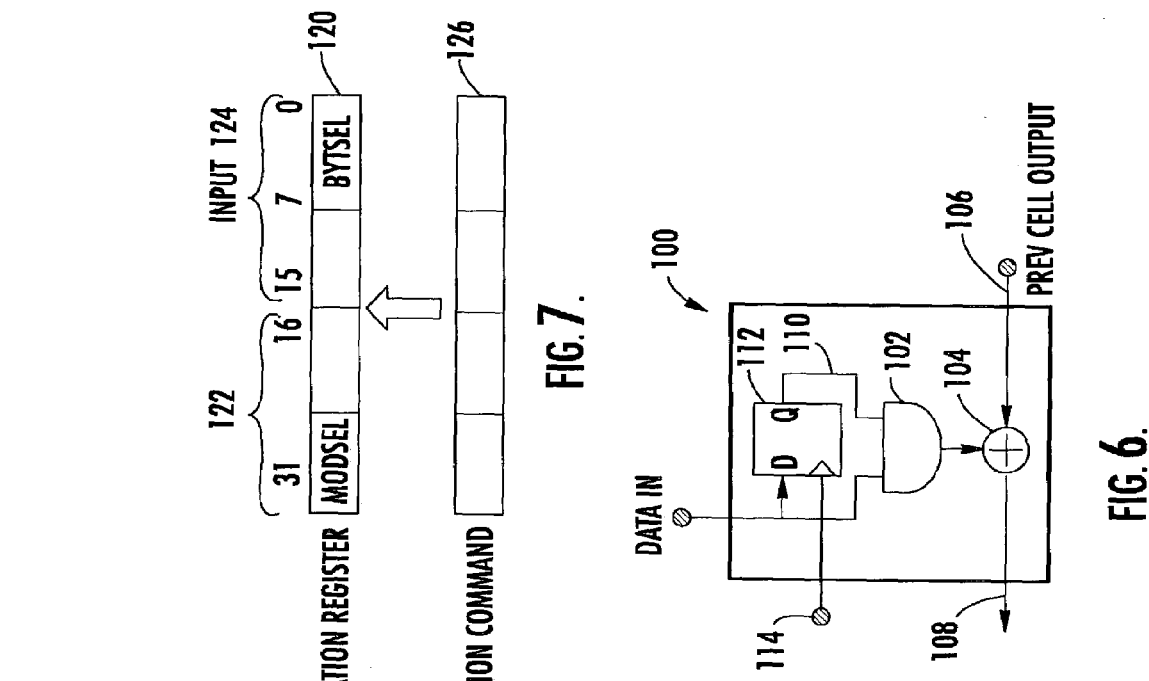
FIG. 7 is a schematic illustration of the configuration command and configuration register which select the storage plane and reconfigure the input circuit.

Storage plane selector circuit 20 and reconfigurable input circuit 14, FIG. 1 are controlled by configuration register 120, FIG. 7, a thirty-two bit register which devotes sixteen bits to operate storage plane selector circuit 20, plane section 122 and sixteen bits to operate the reconfigurable input circuit 14, input section 124. For example, the input 124 section of sixteen bits denominated 0–15 requires only four bits to operate the four multiplexors 60–66 one bit/multiplexor "0" for selecting the byte from register 40 and "1" for selecting from register 42 as shown in this example. However, if eight of the bits are used eight multiplexors could be used to serve a 64 bit matrix. If sixteen bits are used sixteen multiplexors could be used for 128 bit matrix. In a similar fashion, the sixteen bits available from positions 16–31 of plane section 122 of configuration register 120 can be used to select a large number of different storage planes containing control patterns representing a very large number of different functions. The control bits which are loaded in configuration register 120 to select the storage plane and reconfigure the input circuit appropriately so that the input data is delivered to the enabled cells to apply to the input data the function that the enabled cells represent. This information comes from a configuration command 126 from a microprocessor or any suitable hierarchical controller. Storage device 112' normally includes a number of individual storage units, 112a, 112b, 112c, 112d, 112 . . . as shown in FIG. 8 wherein each of those storage units may be a simple flip-flop and each one constitutes a part of a different storage plane. Alternatively, storage device 112", FIG. 9 may include a multistage register 116 including selector 118 which receives $2^n$ data bits in a number of stages 112a', 112b', 112c', 112d', 112e', 112f', 112g', 112h' where each stage implements a storage unit and each stage is associated with a different storage plane.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

Other embodiments will occur to those skilled in the art and are within the following claims:

What is claimed is:

1. A reconfigurable input Galois field linear transformer system comprising:
   a Galois field linear transformer including a matrix of cells;
   a plurality of storage planes for storing control patterns representing a number of different functions;
   a storage plane selector circuit for selecting one of said storage plane representing a said function for enabling the cells of said matrix which define that function, any part of the matrix of cells programmable to use the selected function; and
   a reconfigurable input circuit for delivering input data to said enabled cells to apply that function to the input data.

2. The reconfigurable input Galois field linear transformer system of claim 1 in which each said cell includes an exclusive OR logic circuit, an AND logic circuit having an output connected to said exclusive OR logic circuit, and an input for receiving an input data bit.

3. The reconfigurable input Galois field linear transformer system of claim 1 in which each said storage plane includes a storage device associated with each said cell.

4. The reconfigurable input Galois field linear transformer system of claim 1 in which said storage plane selector circuit includes a plane selection register.

5. The reconfigurable input Galois field linear transformer system of claim 1 in which said reconfigurable input circuit includes at least a first input register and a switching system for directing the input data from said first input register to said enabled cells.

6. The reconfigurable input Galois field linear transformer system of claim 5 in which there is a second input register and said switching system directs input data selectively from said first and second input registers to said enabled cells.

7. A reconfigurable input Galois field linear transformer system comprising:
   a Galois field linear transformer including a matrix of cells;
   a plurality of storage planes for storing control patterns representing a number of different functions, each said storage plane including a storage device associated with each said cell, each said storage device including a plurality of storage units disposed with the associated cell, one storage unit corresponding to each said storage plane;
   a storage plane selector circuit for selecting one of said storage plane representing a said function for enabling the cells of said matrix which define that function; and
   a reconfigurable input circuit for delivering input data to said enabled cells to apply that function to the input data.

8. A reconfigurable input Galois field linear transformer system comprising:
   a Galois field linear transformer including a matrix of cells;
   a plurality of storage planes for storing control patterns representing a number of different functions, each said storage plane including a storage device associated with each said cell, each said storage device including a multistage register disposed with the associated cell, one stage corresponding to each said storage plane;
   a storage plane selector circuit for selecting one of said storage plane representing a said function for enabling the cells of said matrix which define that function; and
   a reconfigurable input circuit for delivering input data to said enabled cells to apply that function to the input data.

9. A reconfigurable input Galois field linear transformer system comprising:
   a Galois field linear transformer including a matrix of cells;

a plurality of storage planes for storing control patterns representing a number of different functions, a storage plane selector circuit for selecting one of said storage plane representing a said function for enabling the cells of said matrix which define that function; and a reconfigurable input circuit for delivering input data to said enabled cells to apply that function to the input data, said reconfigurable input circuit including at least a first input register and a switching system for directing the input data from said first input register to said enabled cells, said switching system including a plurality of switching circuits one associated with each byte of input data in said first input register.

10. The reconfigurable input Galois field linear transformer system of claim 9 in which said switching circuits include a multiplexor for presenting inputs from said input registers.

11. A reconfigurable input Galois field linear transformer system comprising:

a Galois field linear transformer including a matrix of cells;

a plurality of storage planes for storing control patterns representing a number of different functions, each said storage plane including a programmable storage device associated with each said cell;

a storage plane selector circuit for selecting one of said storage plane representing a said function for enabling the cells of said matrix which define that function; and a reconfigurable input circuit for delivering input data to said enabled cells to apply that function to the input data.

12. A reconfigurable input Galois field linear transformer system comprising:

a Galois field linear transformer including a matrix of cells, each said cell including an exclusive OR logic circuit, an AND logic circuit having an output connected to said exclusive OR logic circuit, and an input for receiving an input data bit;

a plurality of storage planes for storing control patterns representing a number of different functions;

a storage plane selector circuit for selecting one of said storage plane representing a said function for enabling the cells of said matrix which define that function; and a reconfigurable input circuit for delivering input data to said enabled cells to apply that function to the input data.

* * * * *